United States Patent [19]

Nelson

[11] Patent Number: 4,598,329
[45] Date of Patent: Jul. 1, 1986

[54] SLACK LIMITER FOR VIDEOCASSETTES

[75] Inventor: Norman E. Nelson, Roseville, Minn.

[73] Assignee: Minnesota Mining and Manufacturing Company, Saint Paul, Minn.

[21] Appl. No.: 476,062

[22] Filed: Mar. 17, 1983

[51] Int. Cl.⁴ .................... G11B 15/60; G11B 15/32; B65H 23/08
[52] U.S. Cl. .................... 360/130.21; 242/199; 226/195
[58] Field of Search ............. 360/132; 242/198–199, 242/75.2; 226/195–199; 360/130.3, 130.31, 130.32, 130.33, 130.21

[56] References Cited

U.S. PATENT DOCUMENTS

| 2,935,574 | 5/1960 | Heitner | 360/130.31 |
| 3,797,779 | 3/1974 | Esashi et al. | 242/199 |
| 4,290,567 | 9/1981 | Saito | 242/198 |
| 4,342,436 | 8/1982 | Oyama et al. | 242/199 |
| 4,405,097 | 9/1983 | Gebeke | 242/199 |

OTHER PUBLICATIONS

Allowed U.S. patent application No. 284,222.

Primary Examiner—A. J. Heinz
Attorney, Agent, or Firm—Donald M. Sell; James A. Smith; William L. Huebsch

[57] ABSTRACT

A slack limiter device for magnetic recording tape in a videocassette which has a slotted metal plate forcefully slidaby fitting over an elongated stem on a cassette housing and bonded to a springy film having a low-friction edge covering which presses against moving tape.

1 Claim, 4 Drawing Figures

U.S. Patent  Jul. 1, 1986  4,598,329
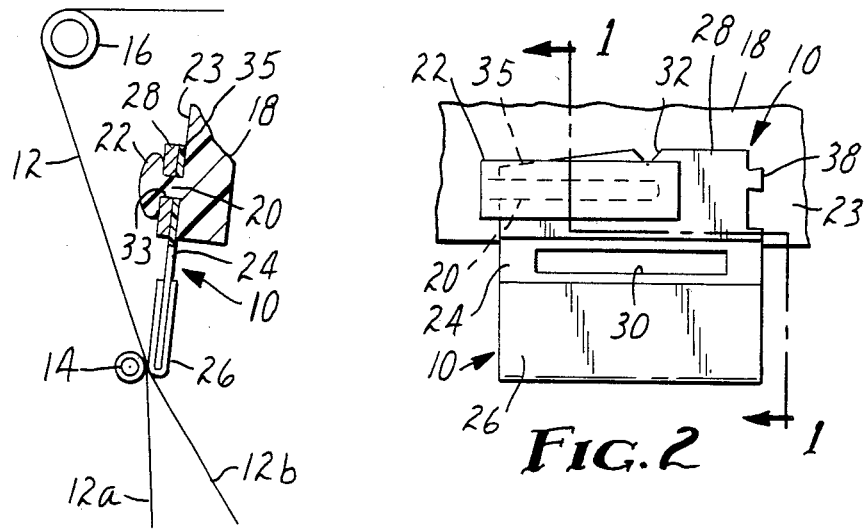
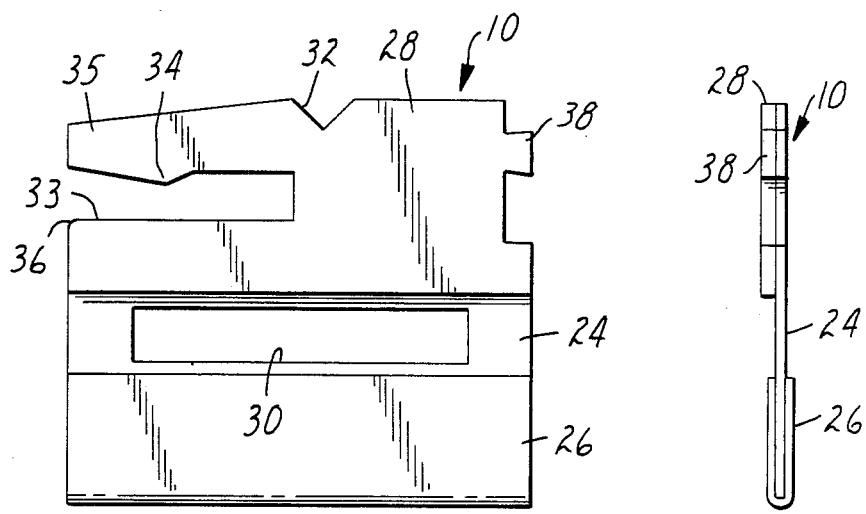
FIG.1  FIG.2  FIG.3  FIG.4

4,598,329

SLACK LIMITER FOR VIDEOCASSETTES

TECHNICAL FIELD

This invention relates to tape motion control in magnetic recording tape videocassettes, and has particular reference to so-called "slack limiter" devices.

BACKGROUND ART

Elimination or limiting of slack in the tape as it is unwound from the reel in a videocassette has been found to be essential for consistently accurate performance. Slack limiter devices have been devised which exert a mild but adequate restraining or tightening effect on the moving tape at or close to a guide. Looseness and flutter in the tape is thereby controlled in much the same way as a loose drive belt is tightened by a spring-mounted idler pulley.

A typical prior art slack limiter device consists of a section of springy plastic film having a frictionreducing edge covering which is pressed against the tape at an acute angle. The section of film is mounted on the frame of the cassette in such a position that its intermediate portion is slightly bowed, the springiness of the film then urging the covered edge against the tape surface and preventing any momentary loosening.

Mounting of the plastic film on the cassette frame by means of adhesives has not been totally reliable. Accurate placement of the device is uncertain. Under the tension imparted by the springiness of the film, the adhesive bond eventually weakens and either permits the spring tension to decrease or allows the entire device to fall away and into the mechanism.

DISCLOSURE OF INVENTION

The present invention provides an improved slack limiter device for videocassettes which incorporates means for accurately and positively, but still replaceably, mounting the device either by hand or by automated assembly.

According to the present invention there is provided a magnetic recording tape cassette comprising a housing including means for defining a tape path and an internal section carrying a projecting elongate stem extending transverse of the tape path; and a slack limiter device comprising a springy plastic film having around one edge margin a low-friction wrapping and across the opposite edge margin a metal plate. The plate is slotted from one side and fits over the stem, preferably between a surface on the housing and a head on the stem to position and anchor the device housing with the wrapping biased against tape along the path by resilient bending of the film.

BRIEF DESCRIPTION OF DRAWING

The present invention will be further described with reference to the accompanying drawing wherein like numbers refer to like parts in the several views and wherein:

FIG. 1 is a schematic plan view showing a slack limiter device according to the present invention shown mounted on a fragment of a housing for a cassette and contacting a tape along a path defined in the housing, with a portion of the housing in cross section taken generally along line 1—1 of FIG. 2;

FIG. 2 is a side view of the slack limiter device of FIG. 1 and the housing fragment on which it is mounted;

FIG. 3 is an enlarged plan view of the slack limiter device of FIG. 1 shown separated from the housing; and FIG. 4 is an edge view of the slack limiter device as shown in FIG. 3.

DETAILED DESCRIPTION

FIG. 1 illustrates the position of a slack limiter device 10 according to the present invention with respect to a path for magnetic recording tape 12 as it is drawn from a full reel (12a) and from a nearly empty reel (12b) past cylindrical guides 14 and 16 that are included in means for defining the tape path in a cassette. The limiter device 10 is supported on a nearby section 18 of a housing for the cassette (FIGS. 1 and 2), being slid onto an elongate stem 20 extending transverse of the tape path and fitting closely between an enlarged outer head 22 and a planar wall surface 23 of the housing section 18.

The limiter 10 is shown in more detail in FIGS. 3 and 4. It includes a thin springy film 24 of plastic material, having around one edge margin a continuous wrapping 26 of low-friction sheet material, and bonded along the opposite margin to a shaped metal plate 28.

A free section of the film 24 lying between the wrapping 26 and the plate 28 has a central elongate opening 30, the dimensions of the opening 30 being selected to reduce the springiness of the section to a desired value.

The metal plate 28 and the film 24 attached thereto have a V-shaped notch 32 generally centrally along the edge of the plate 28 opposite the wrapping 26, and have an elongate slot 33 opening through an edge of the plate 28 and extending to approximately the midpoint of the plate 28 and film 24 which forms an outer leg-like portion 35 of the plate 28. The leg-like portion 35 widens gradually inwardly from its distal end and then abruptly returns to the initial slot width to form a tapered inlet opening and a generally central projection 34 along the slot 33. The corner 36 of the plate opposite the leg 35 at the inlet to the slot 33 is slightly rounded which with the tapered inlet opening to the slot 33 facilitates sliding the limiter 10 over the stem 20. The side of the plate 28 opposite the inlet to the slot is doubly indented, leaving a tab 38 which results from the sequence of cuts made if a series of slack limiters are cut form a continuous laminate of film, metal and edge wrapping, and which serves as a handle during attachment or removal of the slack limiter 10.

Bonding of the plate 28 to the film 24 is most easily accomplished by means of a thermoplastic or thermosetting adhesive. The adhesive may be applied in liquid form to either surface, or may be introduced as a separate thin film between the two, followed by application of heat and pressure to complete the bond.

Pressure-sensitive adhesive tape having a film backing of polytetrafluorothylene or another suitable anti-friction material serves as an effective low-friction wrapping 26.

As shown in FIGS. 1 and 2, the slack limiter 10 is supported against the surface 23 of the housing section 18 with the stem 20 received in the slot 33 and the enlarged head 22 against the side surface of the plate 28, the stem and head 22 having a mushroom-shaped cross section as is most clearly seen in FIG. 1. The edge of the plate 28 defining the side of the slot 32 adjacent the wrapping 26 is straight so that it makes full length contact with a straight side of the stem 20 an end edge of the stem 20 contacts an inner end of the slot 33 to thereby accurately position the limiter 10. The projection 34 on the leg-like portion 35 makes forced contact with the opposite side of the stem 20, and the leg-like portion 35 is thereby placed under spring tension, the notch 32 ensuring that such tension is produced by stress concentrated adjacent the notch 32 so that the deflection force can be reliably predicted and will not cause permanent deformation of the plate 28. The enlarged head 22 is spaced to hold the limiter 10 snugly against the flat surface 23 of the housing section 18. As a result, the slack limiter 10 is accurately positioned and firmly retained in three directions.

Automated application of these devices is assisted by the presence of the opening 30 which permits of storing a quantity of the assemblies on a supporting probe for controlled release as required.

I claim:

1. A magnetic recording tape cassette comprising a housing including means for defining a tape path and an internal section comprising a back surface, an elongate stem projecting from said back surface and having side surfaces extending transverse of said path, and an enlarged head on the end of the stem opposite said back surface; and a slack limiter device comprising a springy plastic film having first and second opposite edges, edge margins adjacent each of said opposite edges, and a third edge extending between said opposite edges, a low-friction wrapping extending around said first edge and along the edge margins adjacent said first edge, and a metal plate along one of the edge margins adjacent said second edge, said plate and film having a slot opening from said third edge and having an inner end opposite said third edge, and being positioned in close fitting relationship between said head and said back surface with said stem in close fitting engagement in said slot to anchor said device within said housing with said low friction wrapping biased against tape along said path by resilient bending of said film, said metal plate being resiliently bendable and having a projection midway along said slot engaging the side surface of said stem opposite said low friction wrapping, and said plate being notched adjacent the inner end of the slot and being resiliently bent adjacent said notch to provide spring tension in said plate biasing said projection against said stem.

* * * * *